A. H. BASTIAN.
COMBINED WEEDER AND CULTIVATOR.
APPLICATION FILED FEB. 19, 1915.
1,144,314.
Patented June 22, 1915.
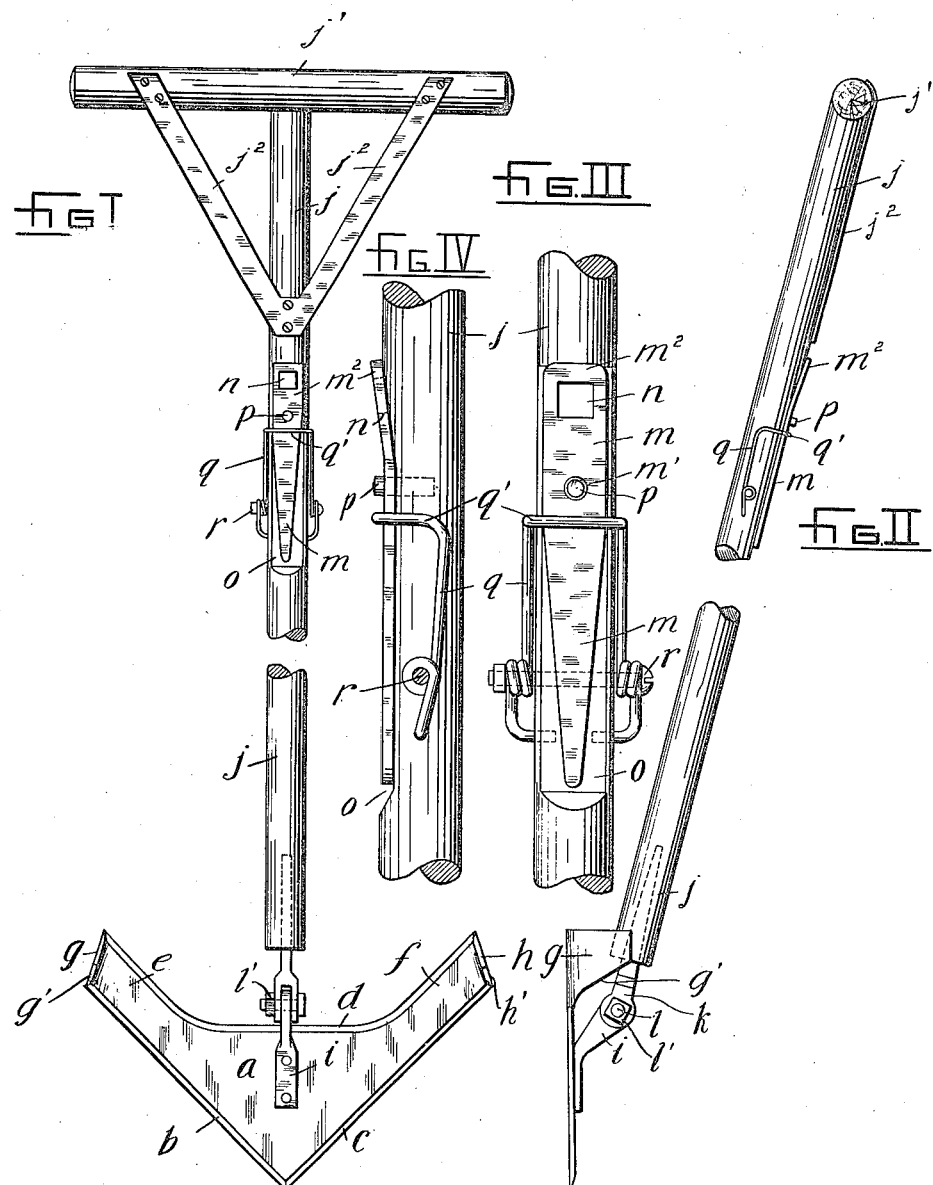
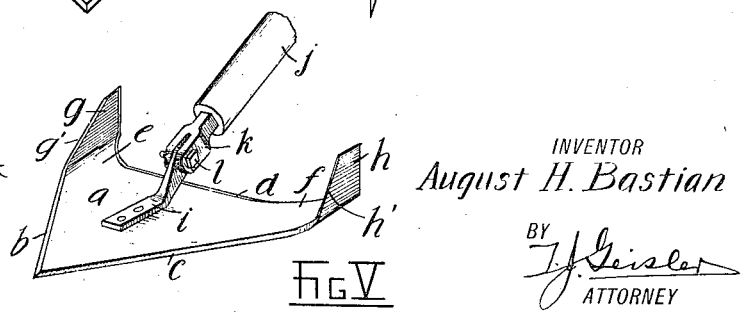
WITNESSES:
INVENTOR
August H. Bastian
BY
ATTORNEY

UNITED STATES PATENT OFFICE.

AUGUST H. BASTIAN, OF HILLSDALE, OREGON.

COMBINED WEEDER AND CULTIVATOR.

1,144,314.  Specification of Letters Patent.  Patented June 22, 1915.

Application filed February 19, 1915. Serial No. 9,436.

*To all whom it may concern:*

Be it known that I, AUGUST H. BASTIAN, a citizen of the United States, and a resident of Hillsdale, county of Multnomah, in the State of Oregon, have invented a new and useful Improvement in Combined Weeders and Cultivators, of which the following is the specification.

The object of my invention is to provide an inexpensive, easily handled and convenient implement, by which efficient cultivating and weeding work may be done.

A further object of my invention is to provide an implement of the character specified which is especially serviceable for cultivating among young plants, having a tendency to prevent the beating down and covering up of the latter by the earth moved by my implement.

The structural features and the operation of my implement are more readily understood by having reference to, and describing the accompanying drawings, in which—

Figure I is a front elevation of my implement with parts broken away. Fig. II is a side elevation of my implement. Figs. III and IV are, respectively and in the order named, a larger scale top view, and a side view of a part of the handle of my implement, and show convenient means for carrying the wrench used in adjusting my implement. Fig. V is a perspective detail illustrating the construction of the blade of my implement, also showing a part of the handle thereof, and the means whereby the handle is adjustably fastened to the blade.

My implement consists of a flat blade ($a$) made of thin metal. The front of the blade is made with knife-like edges ($b$) ($c$) diverging from a point. The back of the blade ($d$) is also made with a knife-like edge. The blade ($a$) is formed at its ends with narrow arms ($e$) ($f$) projecting laterally and rearwardly. The extremities of such arms or ends are formed with perpendicular or upturned sides ($g$) ($h$). The latter are spaced farther apart at the front than at the rear, as will be noted from Fig. I. The front faces of said sides are made with oblique knife edges ($g'$) ($h'$). The purpose of the laterally projecting arms ($e$) ($f$) is to make my implement of sufficient width and to make its lateral extremities somewhat flexible. Incidentally, such construction lightens the weight of my blade, and prevents the same from carrying too much earth in its operation, and in so doing renders my implement convenient to use. The oblique knife edges of my implement also tend to facilitate its operation; likewise, the forming of the front edges of my implement on oblique converging angles, such construction permitting my implement to cut more readily and easily through the earth being cultivated.

As mentioned in the introduction, my implement is especially designed to be used for cultivating among young plant shoots. When so used the laterally projecting arms with their turned-up or perpendicular sides ($g$) ($h$) have a tendency to pull the earth from the plants in the operation of cultivating the ground, and to prevent plants from being injured by being beaten down and covered up by the earth moved by my implement. To the same end said perpendicular sides are spaced farther apart at the front than at the rear.

On the blade is fastened a stub shank ($i$), the free end of which is provided with a perforation. The handle ($j$) is made with a bifurcate, perforated, compressible part ($k$) through which is inserted a screw bolt ($l$). The purpose of the last described construction is to render the blade ($a$) relatively adjustable to the handle ($j$), and in so doing facilitating the use of my implement.

Since the adjustability of my implement is one of its features, it is necessary to carry with it a suitable wrench, in order that such adjustability may be at all times readily effected. For such purpose I provide a wrench ($m$) made of a flat piece of metal, having a hole ($n$) adapted to fit the nut ($l'$). In order to carry this wrench conveniently about, I make the handle ($j$) with a recess ($o$) in which to lay the wrench ($m$). The latter is made with a perforation ($m'$) arranged relatively to a stud pin ($p$) provided on the handle ($j$). A spring arm ($q$) fastened on a bolt ($r$) is adapted to hold the wrench in place; the extremity ($q'$) of the arm being formed to approximately represent three sides of a square, and by this construction being adapted to embrace the wrench ($m$) and prevent its lateral movement on the stud pin ($p$). The extremity ($m^2$) of the wrench is slightly inclined, as more readily observed from Figs. II and IV, so as to facilitate the removal of the wrench.

I claim:

1. A tool of the character described, consisting of a flat blade having its ends formed with perpendicular sides, the latter being spaced farther apart at the front than at the rear, the front faces of said sides being made with oblique knife edges, and a handle fastened to said blade.

2. A tool of the character described, consisting of a flat blade having its front made with knife-like edges converging on oblique lines, and having its ends formed with narrow arms projecting laterally and rearwardly, the extremities of such arms being formed with perpendicular sides, the latter being spaced farther apart at the front than at the rear, the front faces of said sides being made with oblique knife edges, and a handle fastened to said blade.

AUGUST H. BASTIAN.

Witnesses:
WM. C. SCHMITT,
D. E. CRABB.